United States Patent [19]
Zankl

[11] 4,133,423
[45] Jan. 9, 1979

[54] SHUTTLE SYSTEM FOR MACHINE TOOL

[75] Inventor: Frank Zankl, Milwaukee, Wis.

[73] Assignee: Kearney & Trecker Corporation, West Allis, Wis.

[21] Appl. No.: 844,206

[22] Filed: Oct. 21, 1977

[51] Int. Cl.² .............................................. B65G 47/00
[52] U.S. Cl. .................................... 198/339; 29/33 P; 29/563; 51/216 ND; 51/240 R; 214/1 BB; 269/56; 269/71
[58] Field of Search ............... 198/339, 472, 648, 344, 198/345, 736; 214/1 BB, 6 P; 51/216 ND, 240 R; 29/33 P, 563; 269/56, 71

[56] References Cited

U.S. PATENT DOCUMENTS

| | | | |
|---|---|---|---|
| 2,508,861 | 5/1950 | Jessen | 214/6 P |
| 2,940,384 | 6/1960 | Munschauer et al. | 100/214 |
| 2,985,926 | 5/1961 | Fellows | 164/323 X |
| 3,825,245 | 7/1974 | Osburn et al. | 269/30 |

Primary Examiner—Robert W. Saifer
Assistant Examiner—Douglas D. Watts
Attorney, Agent, or Firm—Cyril M. Hajewski

[57] ABSTRACT

A pair of substantially identical shuttle tables are mounted on the bed of a vertical spindle machine tool on opposite sides of the worktable thereof. A first pallet is mounted on the worktable and a second pallet is mounted on one of the shuttle tables. Both pallets have a tunnel therein that extends all the way through the pallet. A hydraulic ram with an elongated piston rod is mounted on each shuttle table. Each piston rod is long enough to pass completely through the tunnel in an adjacent pallet and to bear against a pallet on the worktable while the base of the piston rod bears against the adjacent pallet. When the piston rod is extended, both pallets are simultaneously pushed in the same direction so that the pallet on the worktable is shifted to the empty shuttle table while the pallet on the other shuttle table is shifted onto the worktable. When the piston rod is subsequently retracted, both pallets remain in their shifted position. When the other piston rod is extended, both pallets are simultaneously pushed back to their original positions.

8 Claims, 6 Drawing Figures

SHUTTLE SYSTEM FOR MACHINE TOOL

BACKGROUND OF THE INVENTION

This invention relates to shuttle systems for machine tools. Many machine tools have some form of shuttling equipment that is used to move a pallet carrying a machined workpiece from the machining position to an unloading position and to replace it with a pallet carrying an unmachined workpiece. Such equipment is often cumbersome and complex in its design and is usually an integral part of the machine tool.

The principal object of this invention is to provide a simple shuttle system which can be added to existing machine tools without any substantial change in the construction of the existing machine tool. Other objects and advantages of the invention will be apparent from the detailed description herein.

SUMMARY OF THE INVENTION

Two substantially identical shuttle tables are attached to the bed of a machine tool on opposite sides of the worktable thereof. One pallet is mounted on the worktable and another pallet is mounted on one of the shuttle tables. Both pallets have a tunnel that extends completely through the pallet. A pair of hydraulic rams with elongated piston rods are each mounted on a corresponding one of the shuttle tables. Each piston rod is long enough to extend completely through the tunnel in an adjacent pallet and to bear against a pallet on the worktable to push the pallet off the worktable when the piston rod is extended.

DESCRIPTION OF THE PREFERRED EMBODIMENTS

Figure 1:
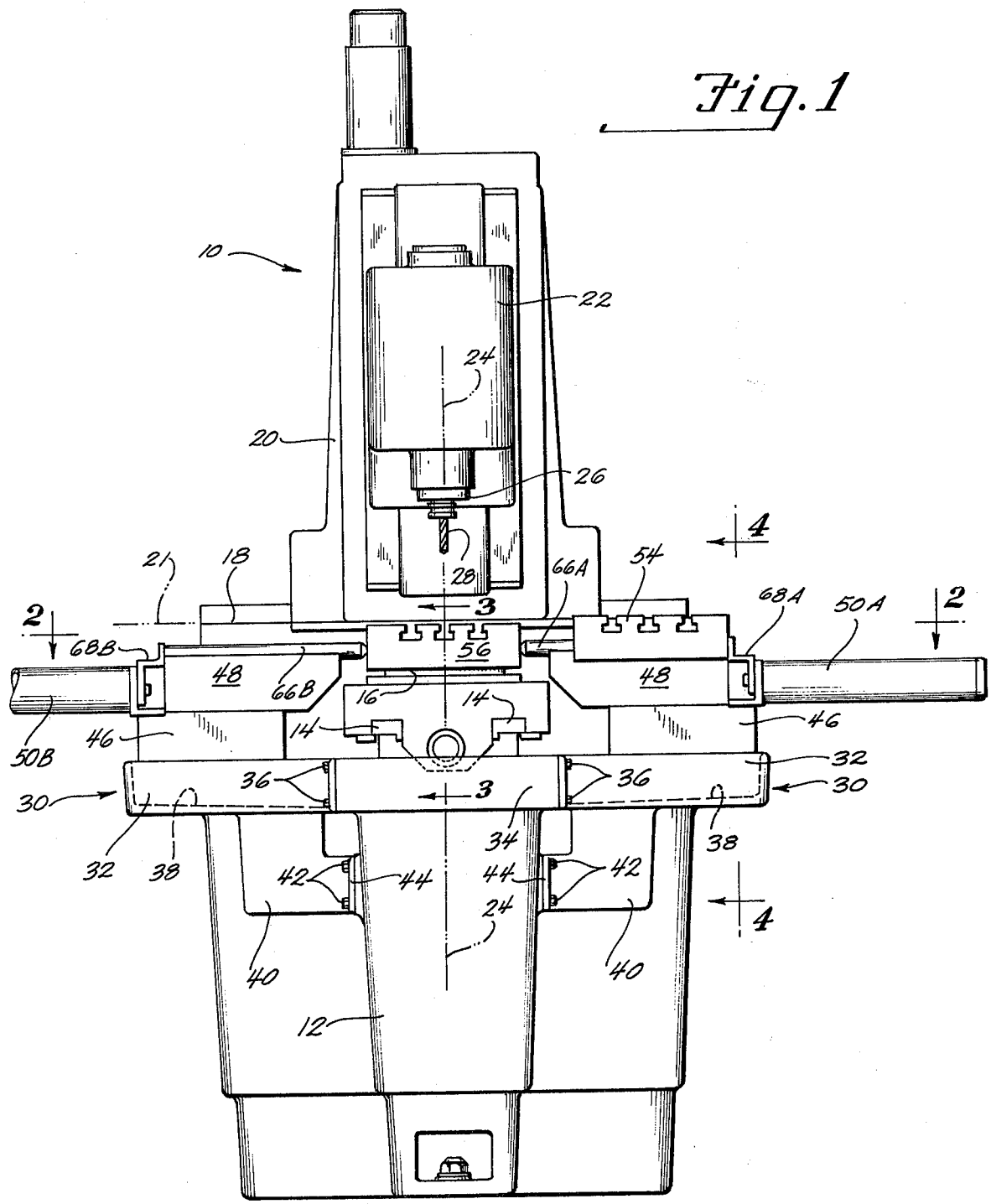
FIG. 1 is a front elevational view of a preferred embodiment of the invention mounted on a vertical spindle machine tool.

FIGS. 1 to 6 illustrate one preferred embodiment of the invention that is an attachment to a vertical spindle machine tool 10 (FIG. 1). Machine tool 10 includes a bed 12 that supports a first pair of horizontal ways 14, a worktable 16 slidably mounted on ways 14 for movement along a horizontal axis 17 (FIG. 2), a second pair of horizontal ways 18 (FIG. 1) supported by bed 12, an upright 20 slidably mounted on ways 18 for movement along a horizontal axis 21 which is perpendicular to axis 17, a spindle head 22 slidably mounted on upright 20 for movement along a vertical axis 24 which is perpendicular to both axes 17 and 21, and a spindle 26 rotatably mounted on spindle head 22 for rotation about axis 24. Spindle 26 is adapted to receive and hold a tool 28 for performing work on a workpiece (not shown) supported on worktable 16.

Figure 2:
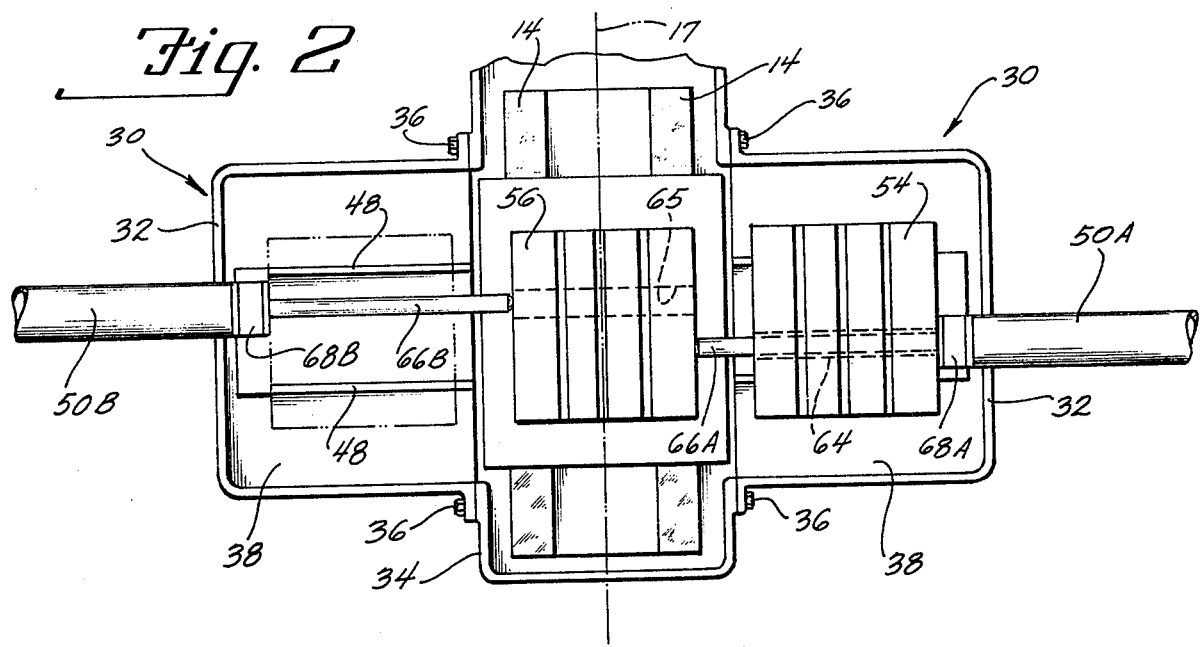
FIG. 2 is a plan view taken on the line 2—2 of FIG. 1.

The shuttle atachment includes two substantially identical shuttle tables 30 which are both attached to bed 12 on opposite sides of worktable 16. Each shuttle table 30 includes a pan portion 32 which is shaped and positioned to mate with the pan portion 34 of machine tool 10. As best shown in FIG. 2, shuttle pan portions 32 are bolted to machine tool pan portion 34 by bolts 36.

In cases where the machine tool pan 34 is not open at the sides to match the shuttle pan portions 32, such openings can be easily cut therein. In cases where the shuttle attachment is not used with machine tool 10, panels can be easily added to close the open sides of machine tool pan 34. Each shuttle pan portion 32 is open at the top and has a bottom 38 which is sloped slightly downwardly toward machine tool bed 12 so that fluids in the bottom of pan portions 32 will flow into the machine tool pan 34.

Shuttle table pan portions 32 are supported from below by L-shaped brackets 40 which are welded at their top to pan bottoms 38 and are attached to their inner side to bed 12 by bolts 42. Bolts 42 fit through openings in flanges 44 which are welded to the inner side of brackets 40 and fit flush against the sides of bed 12.

Figure 3:
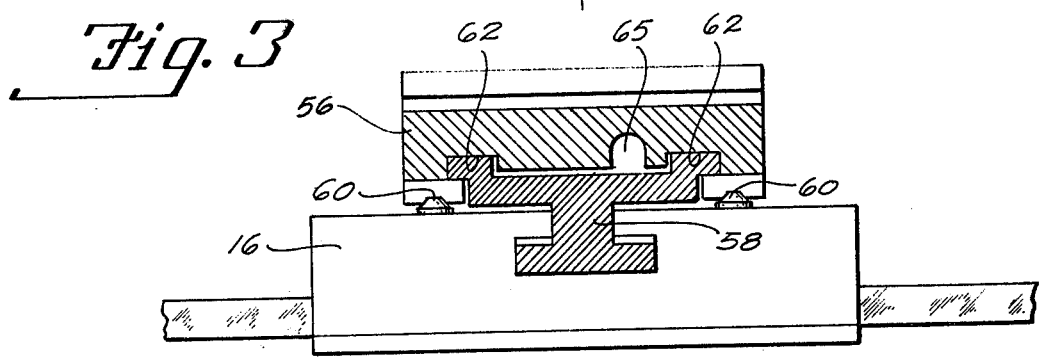
FIG. 3 is a longitudinal sectional view taken on the line 3—3 of FIG. 1.
Figure 4:
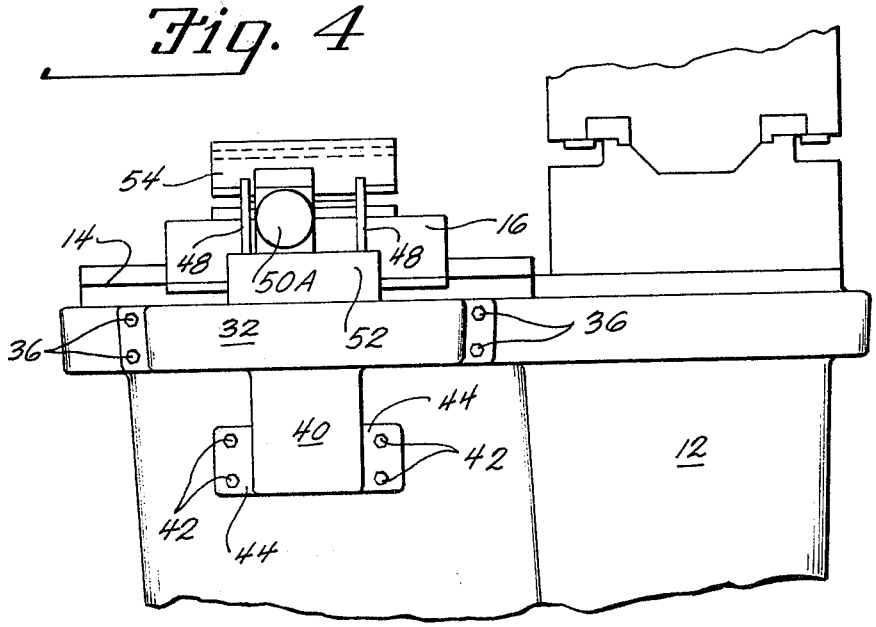
FIG. 4 is a side elevational view taken on the line 4—4 of FIG. 1.

A pair of risers 46 are attached to the bottom 38 of each pan portion 32 and support a pair of pallet guides 48 and a hydraulic cylinder 50. Risers 46 are secured against sideways movement by sides 52 (FIG. 4). Pallet guides 48 are positioned to slidably support a machine tool pallet 54 on the same level as a machine tool pallet 56 which is supported on worktable 16. As shown in FIG. 3, worktable 16 includes a pallet clamp 58 which is hydraulically movable between a downward clamped position in which pallet 56 is pressed against locator buttons 60 and an upward unclamped position in which pallet 56 can be slid sideways off worktable 16. Pallet clamp 58 fits into conventional grooves 62 in the bottoms of pallets 54 and 56.

In addition to grooves 62, pallets 54 and 56 each have a tunnel 64 and 65, respectively, which extend all the way through the pallet parallel to grooves 62. As best shown in FIG. 2, tunnels 64 and 65 are positioned to accommodate elongated piston rods 66A and 66B which project from the inner ends of hydraulic rams 50 and are attached to the pistons thereof. The right shuttling ram 50A is positioned so that its elongated piston rod 66A passes through the tunnel 64 in pallet 54 while the left shuttling ram 50B is positioned so that its elongated piston rod 66B passes through the tunnel 65 in pallet 56. Each of the elongated piston rods 66 are long enough to extend completely through pallets 54 or 56 and bear against the other pallets, as shown in FIG. 2, where the end of right piston rod 66A contacts pallet 56. Piston rods 66A and 66B are mounted on brackets 68A and 68B which are dimensioned to bear against the edge of an adjacent pallet 54 or 56 when piston rod 66A or 66B is completely extended through tunnel 64 or 65.

In the example shown in FIGS. 1 and 2, right piston rod 66A is completely extended through the tunnel 64 in pallet 54 and right piston rod bracket 68A contacts the outer edge of pallet 54. The end of piston rod 66A contacts the edge of pallet 56. Therefore, when piston rod 66A is extended, both pallets 54 and 56 are simultaneously pushed to the left, in FIGS. 1 and 2, pallet 56 being pushed off of worktable 16 and onto the left shuttle table 30, while pallet 54 is pushed off of right shuttle table 30 and onto worktable 16. As the two pallets move from right to left, in FIGS. 1 and 2, the left piston rod 66B extends through the tunnel 65 in pallet 56, and at the end of the sideways movement, the end of left piston rod 66B bears against the left side of pallet 54 and left piston rod bracket 68B bears against the left side of pallet 56. Therefore, when left piston rod 66B is extended, pallets 54 and 56 are simultaneously pushed from left to right, in FIGS. 1 and 2, back to their original position. When either piston rod 66A or 66B is retracted after being extended, both pallets 54 and 56 remain stationary.

When machine 10 is being used, there will be workpieces mounted on pallets 54 and 56 by conventional fixtures (not shown). When the machining operation is completed on the workpiece in pallet 56, hydraulic ram 50A is actuated to extend piston rod 66A and simultaneously push pallet 56 off of worktable 16 and pallet 54 onto worktable 16. This replaces the machined workpiece with an unmachined workpiece and moves the machined workpiece to an unloading position. Piston rod 66A is then retracted.

While the unmachined workpiece on pallet 54 is being machined, the machined workpiece on pallet 56 is replaced with an unmachined workpiece. After the workpiece on pallet 54 is completely machined, hydraulic ram 50B is actuated to extend piston rod 66B and simultaneously push pallets 54 and 56 back to their original position thereby again replacing the machined workpiece with an unmachined workpiece and moving the machined workpiece to an unloading position. Piston rod 66B is then retracted.

One important feature of the invention is that shuttle tables 30 and the means thereon for receiving pallets are identical in structure and can be interchanged. This significantly reduces manufacturing costs.

Figure 5:
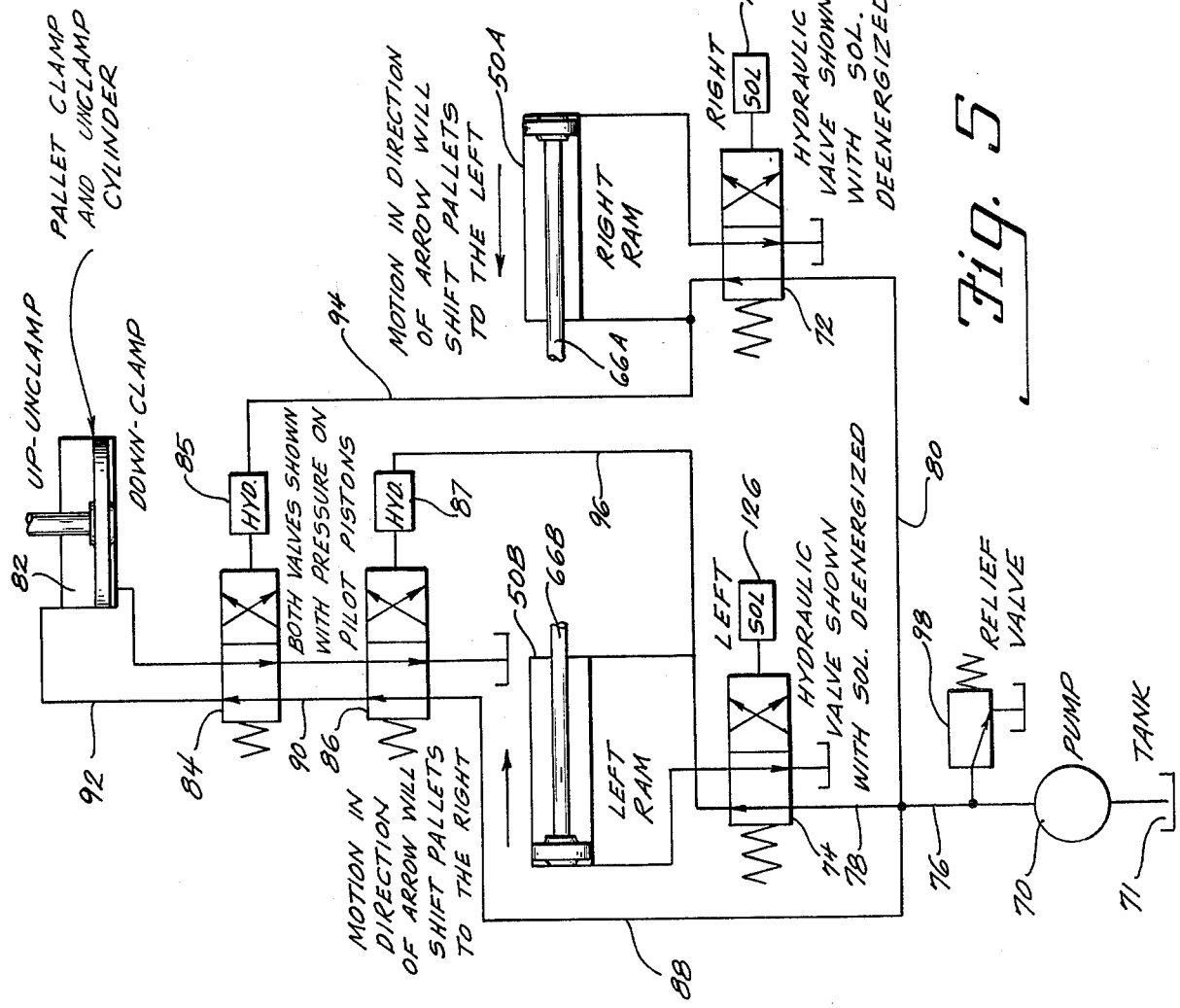
FIG. 5 is a schematic diagram of the hydraulic control system for the embodiment of FIGS. 1 to 4.

FIG. 5 shows the hydraulic circuit for the above-described embodiment. A hydraulic pump 70 pumps hydraulic fluid from a hydraulic tank 71 to right ram 50A and left ram 50B through solenoid valves 72 and 74, respectively, via hydraulic lines 76, 78 and 80. Hydraulic pump 70 also pumps hydraulic fluid to pallet clamp-unclamp cylinder 82 via valves 84 and 86 and hydraulic lines 88, 90 and 92. Valves 84 and 86 have pilot pistons 85 and 87, respectively, which are actuated by hydraulic pressure coupled from solenoid valves 72 and 74 via hydraulic lines 94 and 96, respectively. The maximum hydraulic pressure output of pump 70 is limited by a pressure relief valve 98.

When solenoid valves 72 and 74 are deenergized, the corresponding pilot pistons 85 and 87 are provided with hydraulic pressure through hydraulic lines 94 and 96 to hold valves 84 and 86 in the position shown in FIG. 5 which corresponds to the clamped position of pallet clamp-unclamp cylinder 82. When either solenoid valve 72 or 74 is energized, the corresponding pilot piston 85 or 87 is relieved of pressure which causes the corresponding valve 84 or 86 to switch and move pallet clamp-unclamp cylinder 82 to the unclamp position. This frees the pallet on worktable 16 for movement. When the energized solenoid valve 72 or 74 is subsequently deenergized, hydraulic pressure is again applied to both pilot pistons 85 and 87 which returns pallet clamp-unclamp cylinder 82 to the clamped position.

Figure 6:
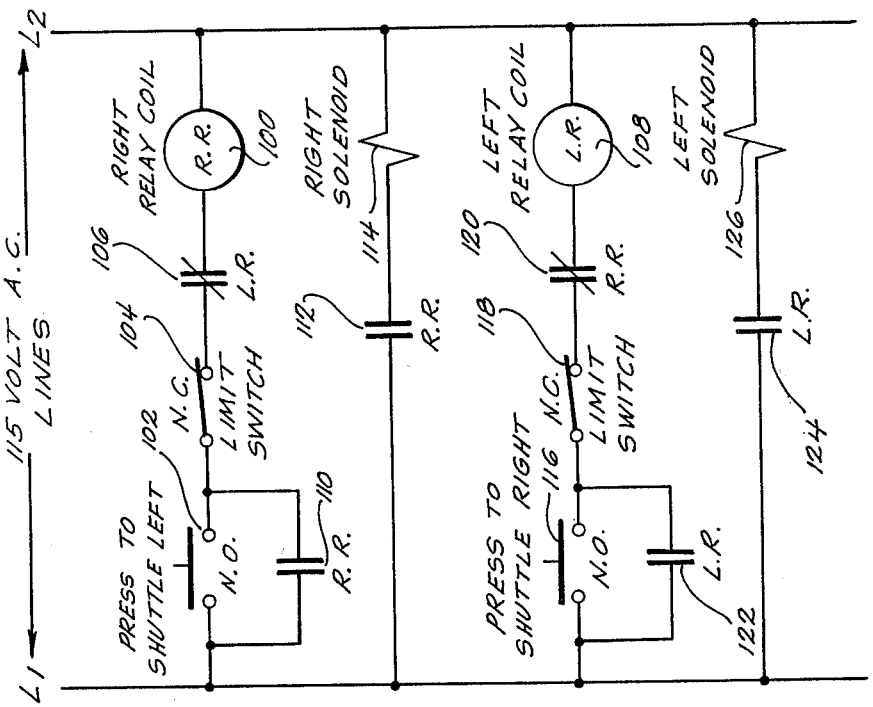
FIG. 6 is a schematic diagram of the electrical control system for the embodiment of FIGS. 1 to 4.

The electrical controls for solenoid valves 72 and 74 are shown in FIG. 6. Right relay coil 100 is energized by the simultaneous closure of normally open pushbutton contacts 102, normally closed right limit switch 104 and normally closed interlock contacts 106 of left relay coil 108 which prevents right relay coil 100 from being energized when left relay coil 108 is energized. Limit switch 104 opens when piston rod 66A is fully extended and closes when piston rod 66A is not fully extended.

Assuming that limit switch 104 and interlocking contacts 106 are closed, right relay coil 100 can be energized by momentary closure of pushbutton contacts 102. When right relay coil 100 is energized, it closes sealing contacts 110, which keeps relay coil 100 energized when pushbutton contacts 102 open, and it closes contacts 112, which energizes right solenoid 114. As explained previously, this causes pallet clamp-unclamp cylinder 82 to unclamp and piston rod 66A to extend. At the full extension of piston rod 66A, limit switch 104 opens which deenergizes right relay coil 100 and right solenoid 114. Deenergization of right solenoid 114 causes piston rod 66A to retract thereby closing limit switch 104 and returning the electrical circuit to its original condition.

Left relay coil 108 is energized in a similar fashion by simultaneous closure of normally open pushbutton contacts 116, normally closed limit switches 118, and normally closed right relay interlock contacts 120 which open when right relay coil 100 is energized to prevent left relay coil 108 from being energized when right relay coil 100 is energized. When left relay coil 108 is energized, it closes sealing contacts 122 which holds coil 108 energized when pushbutton 116 is released and it closes contacts 124 which energizes left solenoid 126 and it opens interlock contacts 106 which prevents right solenoid 114 from being energized. Energization of left solenoid 126 causes pallet clamp-unclamp cylinder 82 to unclamp and piston 66B to extend. At the full extension of piston 66B, limit switch 118 opens and deenergizes left relay coil 108 and left solenoid 126. Solenoid valve 74 then causes piston rod 66B to retract thereby closing limit switch 118 and returning the circuit to its original condition.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A pallet shuttling unit for use in combination with a machine tool having a bed and having a worktable mounted on said bed, said worktable having means thereon for slidably receiving and supporting a pallet, said shuttling unit comprising:

a pair of shuttle tables mounted on said bed on opposite sides of said worktable;

means on each of said shuttle tables for slidably receiving and supporting a pallet;

a tunnel extending all the way through each of said pallets;

a pair of hydraulic rams each mounted on a corresponding one of said shuttle tables;

each hydraulic ram having a piston and an elongated piston rod attached to said piston;

each piston rod being movable between an extended and a retracted position in response to movement of the corresponding piston; and each piston rod being long enough to extend completely through said tunnel in an adjacent pallet in the extended position of said piston rod so that the end of said piston rod can bear against a pallet on said worktable to push said pallet off of said worktable when said piston rod is extended.

2. The pallet shuttling unit according to claim 1 and also comprising:

means on the base of each piston rod for bearing against an adjacent pallet, whereby each piston rod can simultaneously bear against two pallets arranged in side-by-side relationship.

3. The pallet shuttling unit of claim 2 wherein each hydraulic ram is positioned to extend through the tunnel in a pallet sitting on the same shuttle table.

4. The pallet shuttling unit according to claim 1 wherein said worktable has a pan portion and wherein each shuttle table has a pan portion which is dimensioned to fit with the pan portion of said worktable to form a common pan.

5. The pallet shuttling unit according to claim 4 wherein the pan portion of each shuttle table is attached to a corresponding side of the worktable pan portion.

6. The pallet shuttling unit according to claim 5 and also including a pair of braces for supporting said shuttle table pan portions, each brace being attached on its top to the bottom of the corresponding shuttle table pan portion and being attached on its bottom to a corresponding side of said machine tool bed.

7. The pallet shuttling unit according to claim 6 wherein said braces are both L-shaped.

8. A pallet shuttling unit according to claim 1 wherein said shuttle tables and said pallet receiving means thereon are identical in structure so as to be interchangeable.

* * * * *